(12) United States Patent
Schelfaut et al.

(10) Patent No.: US 11,549,554 B2
(45) Date of Patent: Jan. 10, 2023

(54) BEARINGS WITH VISUALLY DISTINCT WEAR INDICATORS

(71) Applicant: General Electric Company, Schenectady, NY (US)

(72) Inventors: Timothy Leo Schelfaut, Lebanon, OH (US); Thomas P. Joseph, West Chester, OH (US); Anthony M. Metz, Harrison, OH (US); Jonathan E. Coleman, Mason, OH (US)

(73) Assignee: General Electric Company, Schenectady, NY (US)

( * ) Notice: Subject to any disclaimer, the term of this patent is extended or adjusted under 35 U.S.C. 154(b) by 282 days.

(21) Appl. No.: 16/850,865

(22) Filed: Apr. 16, 2020

(65) Prior Publication Data

US 2021/0324905 A1 Oct. 21, 2021

(51) Int. Cl.
*F16C 17/24* (2006.01)
*F16C 41/00* (2006.01)
*F16C 33/20* (2006.01)

(52) U.S. Cl.
CPC .......... *F16C 17/246* (2013.01); *F16C 33/205* (2013.01); *F16C 33/206* (2013.01); *F16C 41/008* (2013.01); *F16C 2208/32* (2013.01)

(58) Field of Classification Search
CPC .... F16C 17/246; F16C 33/201; F16C 33/203; F16C 33/205; F16C 33/206; F16C 33/208; F16C 41/008
See application file for complete search history.

(56) References Cited

U.S. PATENT DOCUMENTS

| 2,888,023 | A | | 5/1959 | Eggenberger |
| 5,328,273 | A | | 7/1994 | Nonaka et al. |
| 5,649,417 | A | * | 7/1997 | Hey ................ B64D 27/26 244/54 |
| 9,168,726 | B2 | * | 10/2015 | Ponnouradjou ..... B32B 37/0038 |
| 9,744,582 | B2 | | 8/2017 | LeFevere et al. |
| 11,248,652 | B2 | * | 2/2022 | Iwaki .................. F16C 33/122 |
| 2007/0196632 | A1 | * | 8/2007 | Meyer .................. B05D 1/36 427/430.1 |
| 2012/0106882 | A1 | | 5/2012 | Ponnouradjou et al. |
| 2016/0201719 | A1 | | 7/2016 | Gorges et al. |
| 2017/0081522 | A1 | * | 3/2017 | Adam .................. C09D 7/61 |
| 2018/0011038 | A1 | | 1/2018 | Izrailit et al. |
| 2019/0160623 | A1 | | 5/2019 | Beckman et al. |

FOREIGN PATENT DOCUMENTS

| CN | 102345676 | | 2/2012 |
| CN | 105358847 | | 2/2016 |
| CN | 108869535 | | 11/2018 |
| DE | 102005044565 B3 | | 2/2007 |
| DE | 102011082574 A1 | | 3/2013 |
| DE | 202018101197 U1 | | 7/2019 |
| WO | 2019098281 | | 5/2019 |
| WO | WO2019098281 | * | 5/2019 |

* cited by examiner

*Primary Examiner* — James Pilkington
(74) *Attorney, Agent, or Firm* — Hanley, Flight & Zimmerman, LLC

(57) ABSTRACT

Bearings with visually distinct wear indicators are disclosed. An example bearing disclosed herein includes a movable portion, a race to receive the movable portion along a first surface to thereby permit movement of the movable portion within the race, and a liner disposed on the first surface of the race, the liner having a first layer and a second layer, the first layer disposed on top of the second layer, the first layer visually distinctive from the second layer.

18 Claims, 10 Drawing Sheets

US 11,549,554 B2

BEARINGS WITH VISUALLY DISTINCT WEAR INDICATORS

FIELD OF THE INVENTION

The present disclosure relates generally to bearings and, more particularly, to bearings with visually distinct wear indicators.

BACKGROUND OF THE INVENTION

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section. Gas turbine engines can include bearings to couple sections and/or mount the gas turbine engine to vehicle.

Bearings are mechanical devices that constrain the relative motion of coupled parts therewith to particular motion(s). Bearings include rolling elements (e.g., balls, etc.) and races, in which the rolling elements move. Bearings often include features that reduce the friction between the rolling elements and the races to reduce the loading and/or wear imparted into the coupled parts. For example, bearings can include polytetrafluoroethylene (PTFE) liners. PTFE liners wear after repeated use and, thus, have a finite useful life. As such, bearings with PTFE liners have to be replaced at the PTFE liner's life cycle.

BRIEF DESCRIPTION OF THE INVENTION

Aspects and advantages of the invention will be set forth in part in the following description, or may be obvious from the description, or may be learned through practice of the invention. In one aspect, the present disclosure is directed towards a bearing. The bearing includes a movable portion, a race to receive the movable portion along a first surface to thereby permit movement of the movable portion within the race, and a liner disposed on the first surface of the race, the liner having a first layer and a second layer, the first layer disposed on top of the second layer, the first layer visually distinctive from the second layer. A further aspect of the present disclosure is directed towards an apparatus. The apparatus includes a connecting rod, and a bearing, including a movable portion, race to receive the movable portion along a first surface to thereby permit rotation of the movable portion within the race, and a liner disposed on the first surface, the liner having a first layer and a second layer, the first layer disposed on top of the second layer, the first layer visually distinctive from the second layer.

A further aspect of the present disclosure is directed towards a bearing. The bearing includes a movable portion, a race to receive the movable portion along a first surface to thereby permit movement of the movable portion within the race, and a liner disposed on the first surface of the race, the liner having a first void extending at least partially therethrough.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the is set forth in the specification, which makes reference to the appended FIGS., in which.

DETAILED DESCRIPTION

Figure 1:
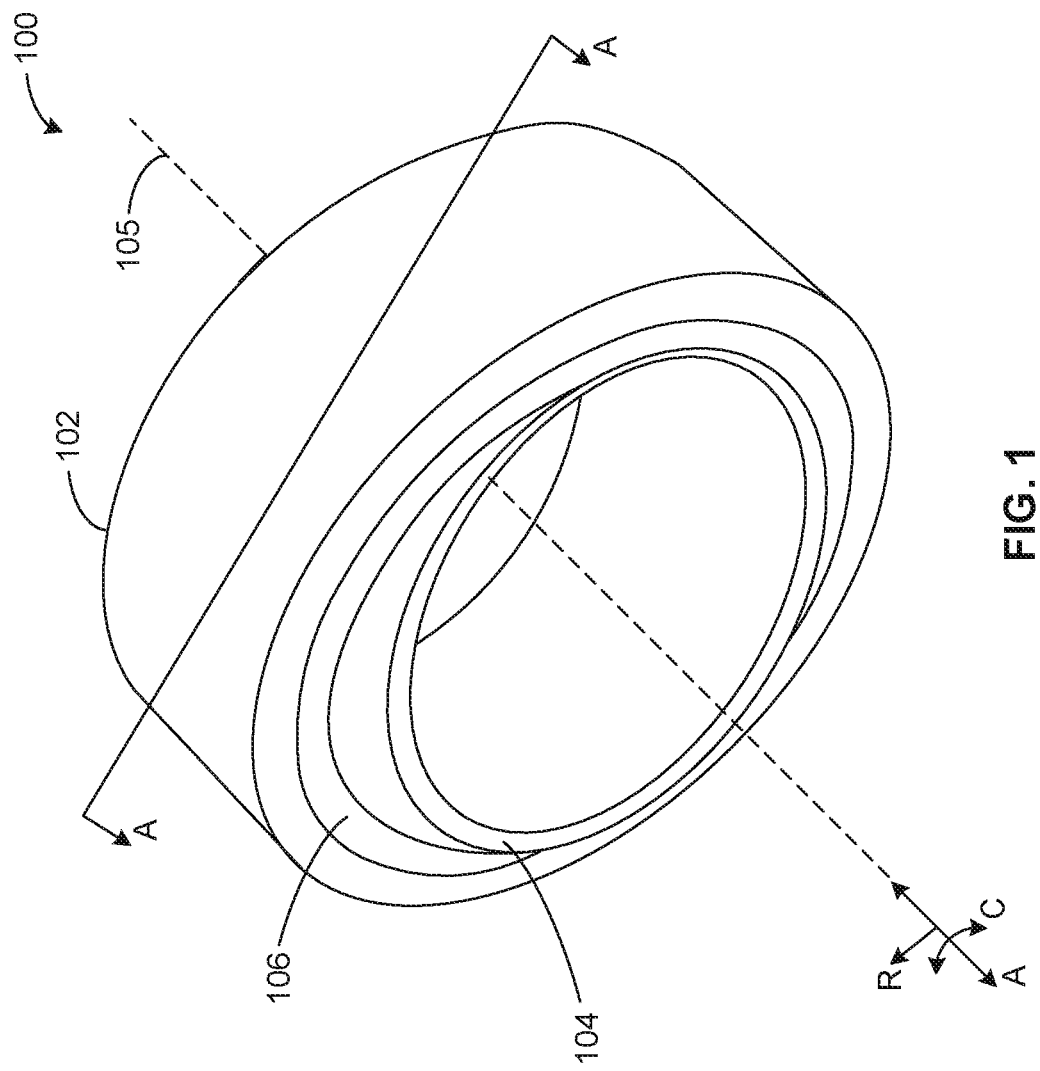
FIG. 1 is an isometric view of a bearing in which the teachings of this disclosure may be implemented.

Aircraft components are frequently inspected to identify parts that have exceeded their service life. The currently used methods to inspect bearings relies on a technician to subjectively determine a bearing is loose (e.g., have a noticeable axial and/or radial play, etc.). These inspection techniques require custom made tooling for each component having a bearing and the accuracy of such is variable based on the ambient humidity and temperature. The deficiencies of the current inspection techniques cause nearly all bearings to be replaced after inspection, regardless of the remaining service life of the bearings. In some examples, replacing a bearing in an aircraft component is costly and requires a significant amount technician time. Examples disclosed herein overcome the above noted deficiencies of current inspection by providing bearings with visually distinct wear layers Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

An example bearing disclosed herein includes a liner having a first PTFE layer having a first color and a second PTFE layer having a second color. In some examples disclosed herein, the thickness of the first PTFE layer corresponds to the half the service life of the bearing. As the bearing wears during its service life, the first PTFE layer is abraded and the second PTFE layer is exposed, which allows a technician to easily identify the bearing should be replaced during inspection. Another example bearing disclosed herein includes a liner with one or more small void(s). As the bearing wears during its service life, portions of the liner around the small void(s) abrade, which allows a technician to measure the depth of void to determine the remaining service life of the bearing. Another example bearing disclosed herein includes a liner with one or more abradable pins with a first layer and a second layer, visually distinct from the first. In some examples disclosed herein, the thickness of the first layer corresponds to a wear threshold corresponding to half the service life of the bearing. As the bearing wears during its service life, the first layer of the pin is abraded and the second layer is exposed, which allows a technician to easily identify the bearing should be replaced during inspection.

Referring now to the drawings, wherein identical numerals indicate the same elements throughout the figures, FIG. 1 is an isometric view of an example spherical bearing 100 (hereafter the "bearing 100") in which the teachings of this disclosure may be implemented. The bearing 100 includes an outer ring 102 (hereafter "race 102") and inner ring 104 (hereafter "ball 104"). As shown in FIG. 1, the bearing 100 is a plain spherical bearing. However, the teachings of this disclosure can be applied to any suitable type of bearing that includes a liner in contact with a movable portion (e.g., a plain bearing, rolling element bearing, etc.). As used herein, a "movable portion" includes the part(s) of a bearing that move relative to the race and/or liner of the bearing. For example, a movable portion can refer to the ball 104 of the spherical bearing 100, the rolling elements (e.g., balls, rollers, gears, etc.) of a rolling-element bearing, etc. A movable portion can, in the case of a rotary bearing, rotate relative to the race and/or liner, or in the case of a linear-motion bearing, translate relative to the race and/or liner. As shown in FIG. 1, the bearing 100 defines a longitudinal axis 105. The axial direction A extends generally parallel to the longitudinal axis 105, the radial direction R extends orthogonally outwardly from the longitudinal axis 105, and the circumferential direction C extends concentrically around the longitudinal axis 105.

During operation, the ball 104 freely rotates within the race 102. The race 102 prevents the ball 104 for translating relative to the race 102. To reduce friction between the ball 104 and the race 102, the bearing 100 includes a liner 106.

As shown in FIG. 1, the liner 106 is disposed on an inner surface of the race 102 circumferentially about the longitudinal axis 105. In FIG. 1, the liner 106 is composed of Polytetrafluoroethylene (PTFE). In other examples, the liner 106 can be composed of any other suitable material (e.g., plastic, fiberglass, bronze, polyethylene terephthalate (PETE), perfluoroalkoxy alkane (PFA), fluorinated ethylene propylene (FEP), aluminum silicon alloy, etc.). The liner 106 has a smooth and evenly contoured surface to minimize friction between the liner 106 and the ball 104. In FIG. 1, the liner 106 is approximately ten millimeters (mm) thick. Alternatively, the liner 106 can have any suitable thickness. FIG. 2A is a front view of the example bearing 100 of FIG. 1. As shown in FIG. 2, the ball 104 is concentrically enclosed by the race 102. The ball 104 defines an inner space 202 in which a shaft can be disposed. In such examples, the movement of the shaft can cause the ball 104 to rub on the liner 106 of the race 102, which causes the liner 106 to abrade. Depending on the movement of the shaft, the wearing of the liner 106 can occur symmetrically (e.g., the liner 106 is worn down evenly) or asymmetrically (e.g., some portions of the liner 106 are worn down more than other portions of the liner). As such, the potential for asymmetric wear of the bearing 100 requires multiple portions of the liner 106 be checked to ensure the bearing 100 has not exceeded its service life. As shown in FIG. 2A, the bearing 100 is bisected by a cross-sectional callout A-A.

Figure 2B:
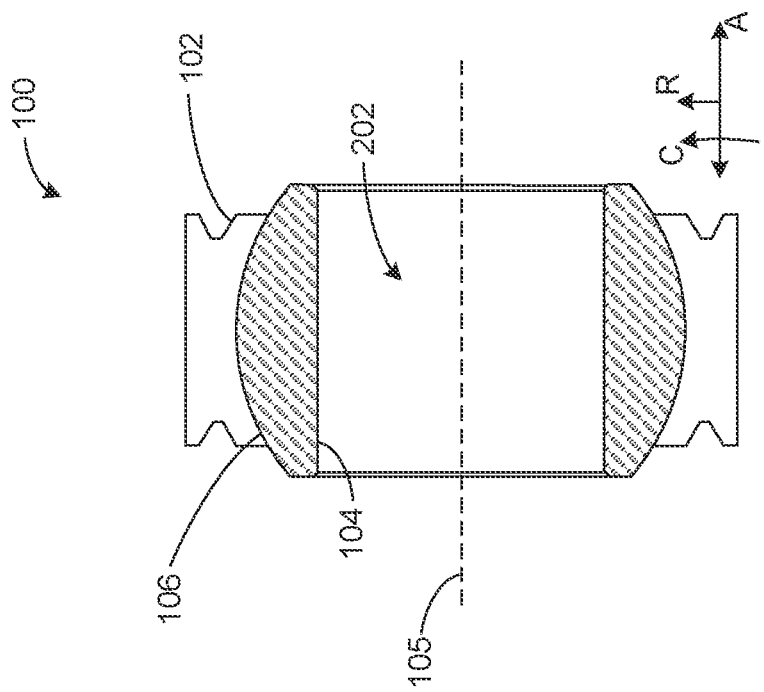
FIG. 2B is a cross-sectional view of the example bearing of FIG. 1.
Figure 2A:
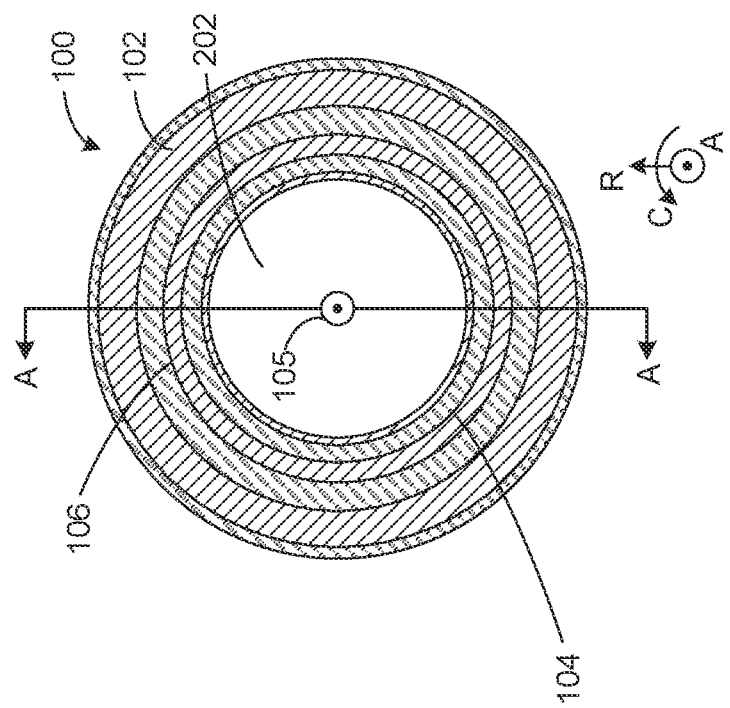
FIG. 2A is a front view of the example bearing of FIG. 1.

FIG. 2B is a cross-sectional view of the bearing 100 of FIG. 1 along the cross-sectional callout A-A. Depending on the amount and distribution of wear on the liner 106, the ball 104 may be able to translate within the race 102. Particularly, the ball 104 may be able to translate along the longitudinal axis 105 (e.g., axial play) and/or in the radial direction (e.g., radial play). The service life of the bearing 100 can be defined based on a maximum allowable amount of axial play and/or radial play.

Figure 3:
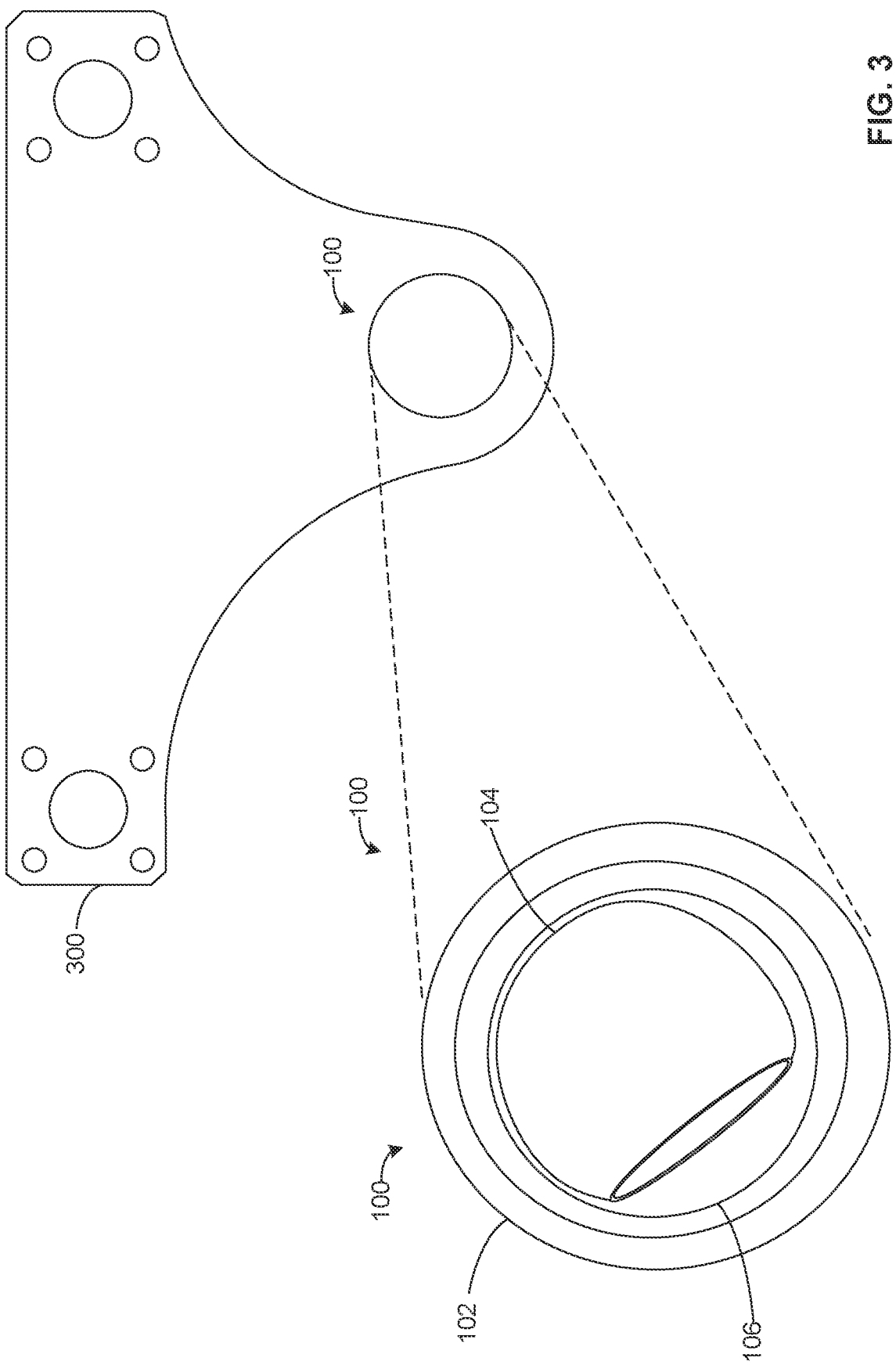
FIG. 3 is top view of the example bearing of FIG. 1 in which the bearing liner is visible.

FIG. 3 is a top view of the example bearing 100 of FIG. 1 disposed in a connecting rod 300 in which the ball 104 is positioned within the race 102 such that the liner 106 is exposed. The connecting rod 300 is a component of a mount that couples a gas turbine engine to a vehicle. Alternatively, the connecting rod 300 can have any suitable shape and/or configuration to couple a gas turbine engine to a vehicle. As shown in FIG. 3, various portions of the liner 106 can be visually inspected by rotating the ball 104 within the race 102. Depending on the size of the bearing 100 or coupling of the connecting rod 300, restrictions in positioning and available space can result in difficulty determining an amount of wear in a portion of the liner 106 using visual inspection and/or conventional tooling. As such, the use of a liner with a visual wear indicator can greatly increase the speed, ease, and accuracy of bearing inspection and wear determination. Such improvement in accuracy also translates into improved safety of the connecting rod 300 and/or other part using the bearing 100, for example.

Figure 4:
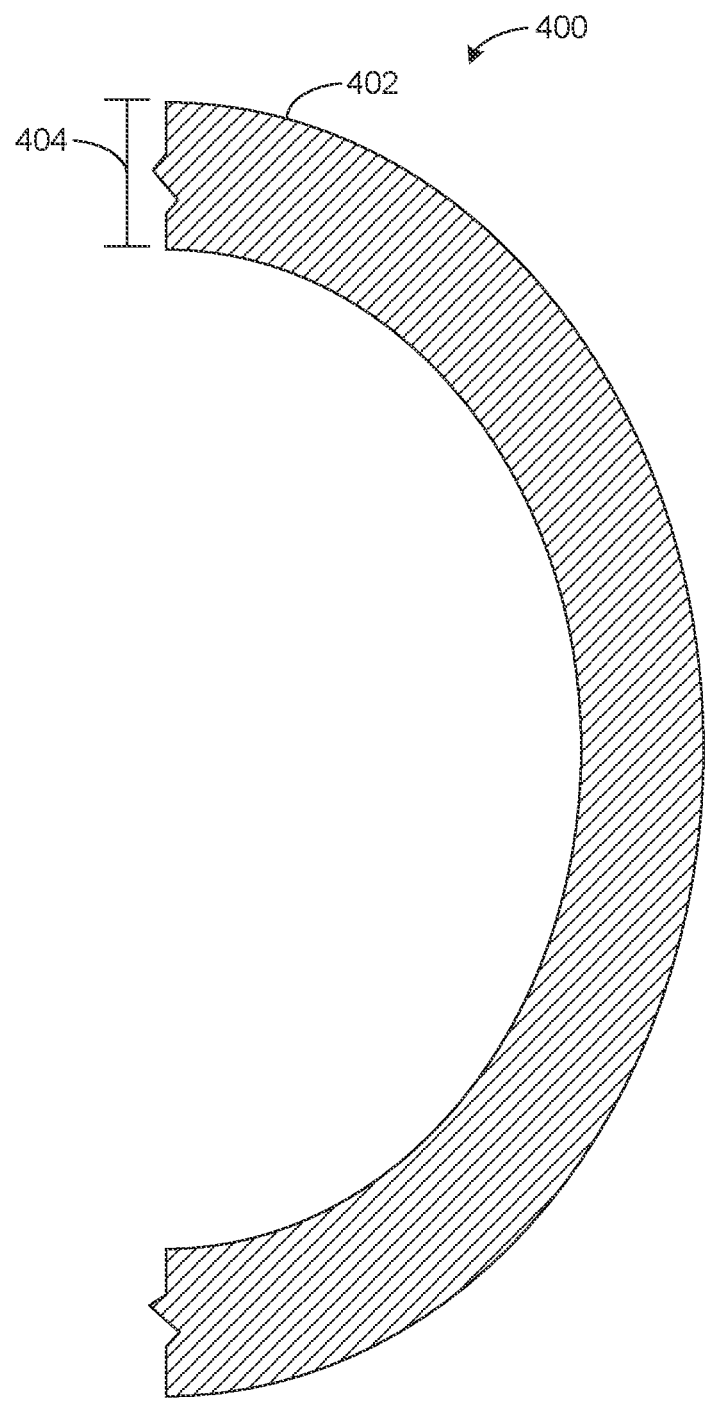
FIG. 4 is a cross-sectional view of a prior art bearing liner.

To illustrate the difficulty of accurate wear assessment, FIG. 4 shows a cross-sectional view of an example prior bearing liner 400. As shown in FIG. 4, the liner 400 is composed of a single layer 402 of PTFE with a uniform thickness 404. During operation, the liner 400 is gradually abraded due to contact with the ball 104. The layer 402 is a uniform color throughout its thickness and circumferentially along the race 102. Due to the uniform visual nature of the liner 400, it is difficult and unreliable, if not impossible, to determine how much the bearing has worn during operation.

Figure 5:
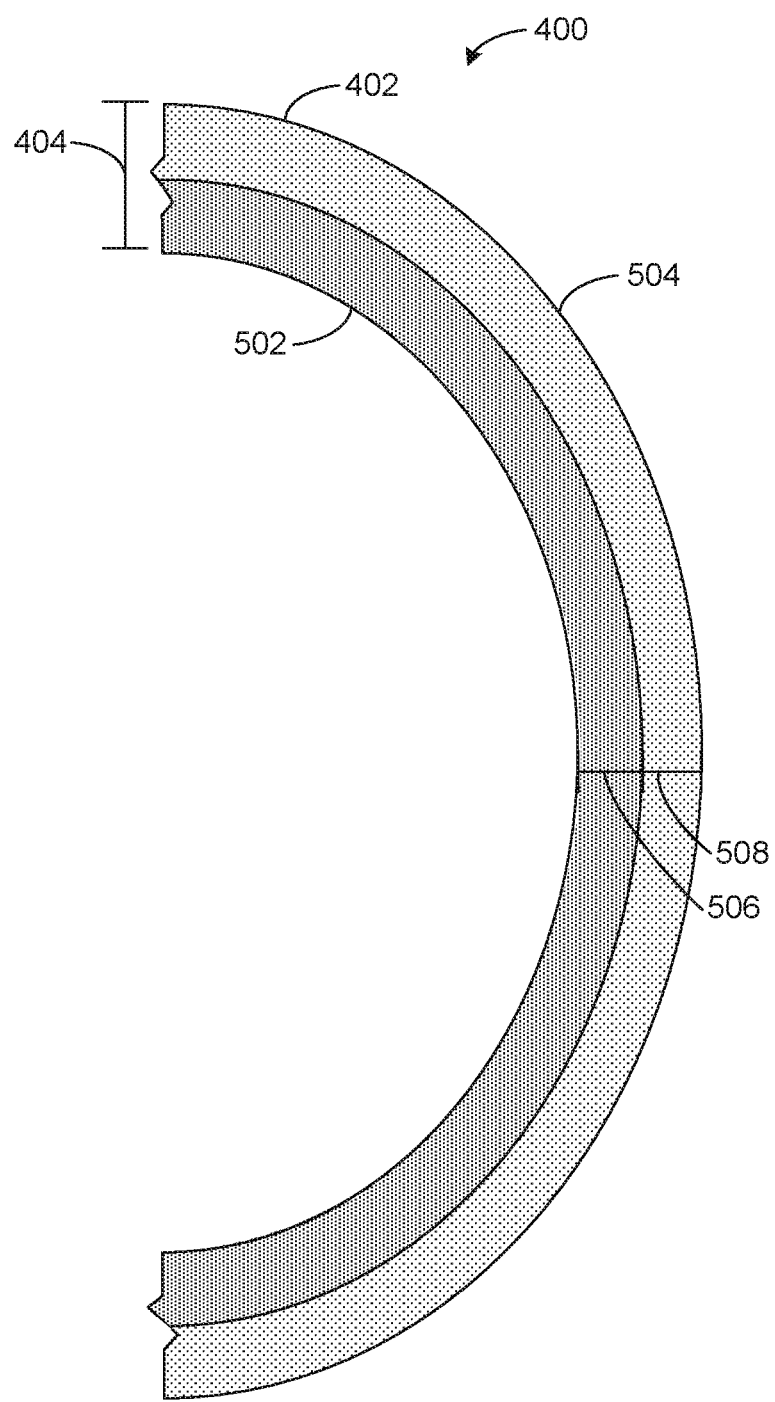
FIG. 5 is a cross-sectional view of the liner of FIG. 3 illustrating the visually distinctive layers.

In contrast to the example of FIG. 4, FIG. 5 is a cross-sectional view of the liner 106 of FIG. 3 illustrating a first layer 502 and a second layer 504 that is visually distinctive from the first layer 402. As shown in FIG. 5, the first layer 502 is disposed on top of the second layer 504 relative to the ball 104 such that the ball 104 is in contact with the first layer 502 at the beginning of the service life of the bearing 100. The first layer 502 has a first thickness 506 and the second layer 504 has a second thickness 508. As shown in FIG. 5, the first layer 502 is visually distinct from the second layer 504. The first layer 502 and the second layer 504 can be visually distinct in any suitable manner (e.g., different colors, different patterns, different textures, different photoluminescence properties, etc.). In some examples, the first layer 502 and the second layer 504 can be composed of the same material (e.g., PTFE, etc.) dyed or otherwise colored a different color. Alternatively, the first layer 502 and the second layer 504 can be composed of different materials that are visually distinctive (e.g., PTFE and plastic, etc.).

As shown in FIG. 5, the first layer 502 and the second layer 504 have the same combined thickness 404 as the single layer 402 of FIG. 4. As such, the liner 106 can be used in the same applications as the prior art liner 400 of FIG. 4. The thickness 506 of the first layer 502 corresponds with a wear threshold of the liner 106. In some examples, the wear threshold corresponds with the level of wear of the bearing 100 that would cause a technician to replace the bearing during inspection. As such, if the second layer 504 is exposed during inspection, the technician has an apparent visual indicator the bearing 100 should be replaced. As shown in FIG. 5, the first thickness 506 is half of the combined thickness 404. Alternatively, the first thickness 506 can be any suitable portion of the combined thickness 404 (e.g., 40%, 60%, etc.).

In other examples, the liner 106 can include more than two layers. In such examples, the additional layer(s) can include a same or different material as the first layer 502 and/or the second layer 504. The additional layer(s) can be visually distinctive from the first layer 502, the second layer 504 and/or the other additional layer(s). The additional layers can also be associated with other wear thresholds. For example, in a three-layered implementation, the top-most layer relative to the ball 104 can be associated with a level of wear associated with a wear threshold corresponding to 30% of the service life of the bearing remaining and the middle layer can be associated with a level of wear associated with a wear threshold corresponding to 50% of the service life of the bearing remaining. Alternatively, the layers can correspond to any suitable level of wear and/or wear threshold(s).

In some examples, the liner 106 is formed by pressing the second layer 504 onto to the race 102 using the same method(s) that can be used to join the prior art liner 400 to a race. Following the pressing of the second layer 504, the first layer 502 can be pressed on top of the second layer 504. Any additional layers can be coupled to the first layer 502 and the second layer 504 using the same techniques. To uniformly join the first layer 502 and the second layer 504, the layers 502, 504 can be sintered together. The layers 502, 504 can be coupled by pre-dyeing the materials used to form the layers or by mixing a separately colored material into the individual layer mixtures prior to forming the individual layers. In some examples, if the layers 502, 504 are composed of a porous material (e.g., PTFE, etc.), one or both of the layers can be colored by soaking the formed layer in a die. In other examples, the layers 502, 504 can be disposed or colored using any suitable method. An example manufacturing method to form the liner 106 is discussed in greater detail below in conjunction with FIG. 8.

Figure 6A:
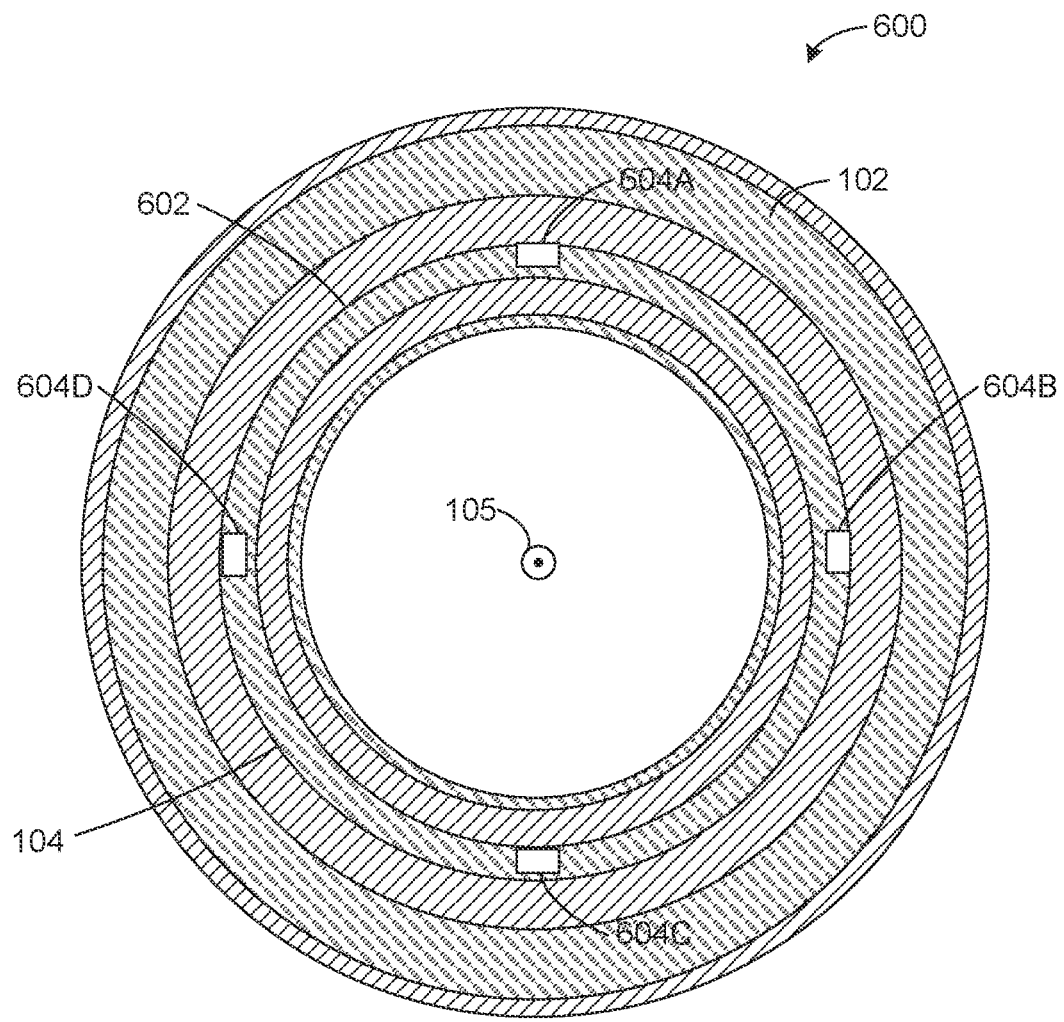
FIG. 6A is a cross-sectional view of a bearing having a first alternative liner with visually distinct layers.

FIG. 6A is a cross-sectional view of a bearing 600 having a first alternative liner 602. As shown in FIG. 6A, the liner 602 includes a first void 604A, a second void 604B, a third void 604C, and a fourth void 604D distributed evenly and circumferentially about the longitudinal axis 105. The voids 604A, 604B, 604C, 604D are through holes in the liner 602. In other embodiments, some or all of the voids 604A, 604B, 604C, 604D are not through holes. While the liner 602 of FIG. 6A is depicted as having the four voids 604A, 604B, 604C, 604D, other examples can have any suitable number of voids (e.g., one void, two voids, etc.) in any suitable configuration (e.g., distributed uniformly about the longitudinal axis 105, distributed non-uniformly about the longitudinal axis 105, etc.).

Figure 6B:
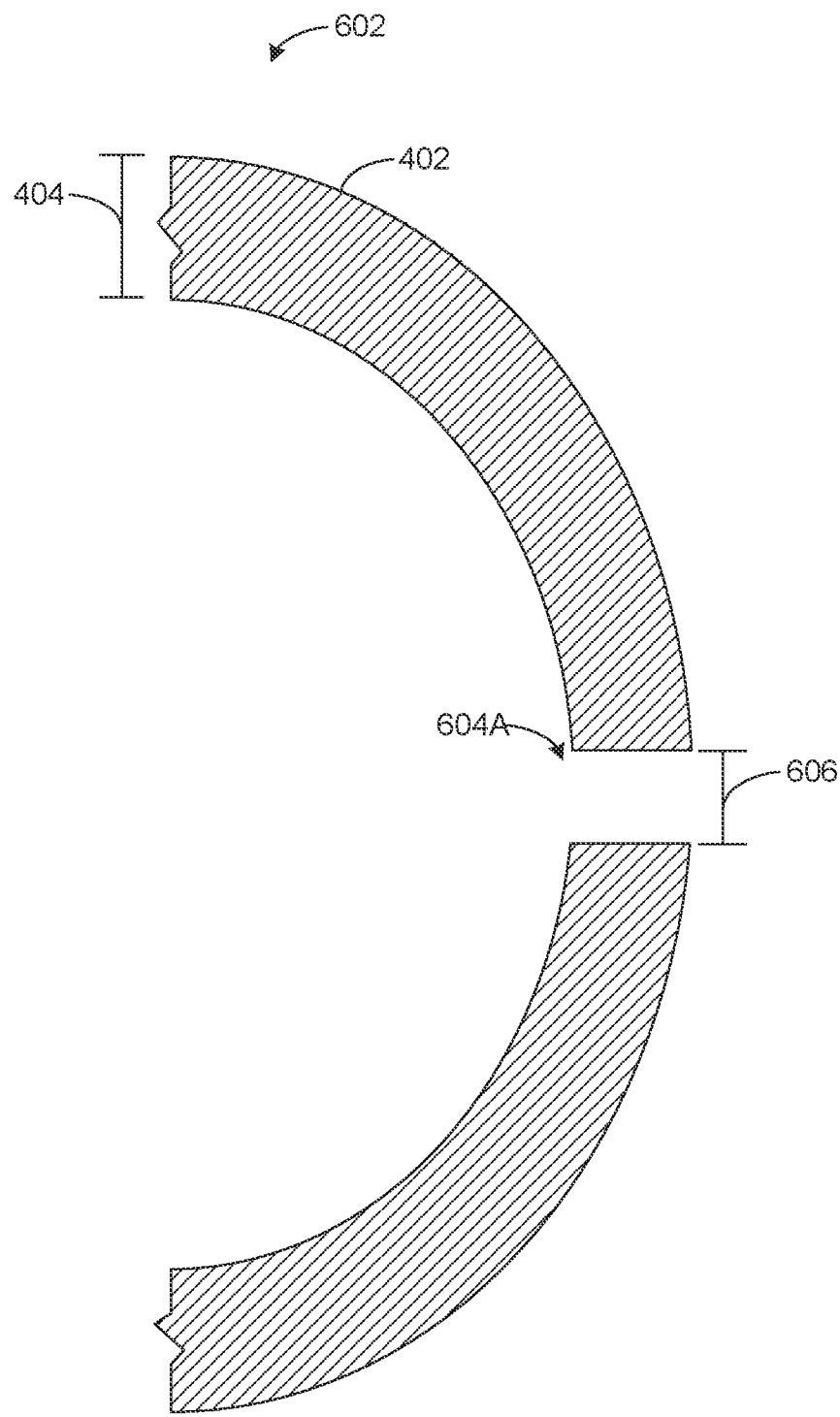
FIG. 6B is a cross-sectional view of the first alternative liner of FIG. 6A with wear-indicating voids.

FIG. 6B is a partial cross-sectional view of the first alternative liner 602 of FIG. 6A. As shown in FIG. 6B, the liner 602 has the same thickness 404 and is composed of the same material as the prior art liner 400. As such, the liner 602 can be used in the same applications as the liner 400. The first void 604A has a circumferential width 606. In some embodiments, the voids 604B, 604C, 604D can have the same width 606 as the first void 604A. Alternatively, the voids 604A, 604C, 604D can have any suitable size or combination of size(s).

The voids 604A, 604B, 604C, 604D enable a technician to measure the amount of wear on the liner 602A using a dimensionally stable putty (e.g., a silicon based putty, etc.). The dimensionally stable putty can be pressed into each of the voids 604A, 604B, 604C, 604D to create impressions of the voids 604A, 604B, 604C, 604D. Such impressions can then be measured to determine the amount of wear and remaining service life of the liner 602. Alternatively, any other suitable means of measuring the wear of the liner 602 using the void(s) can be used (e.g., laser measurement, etc.).

Figure 7A:
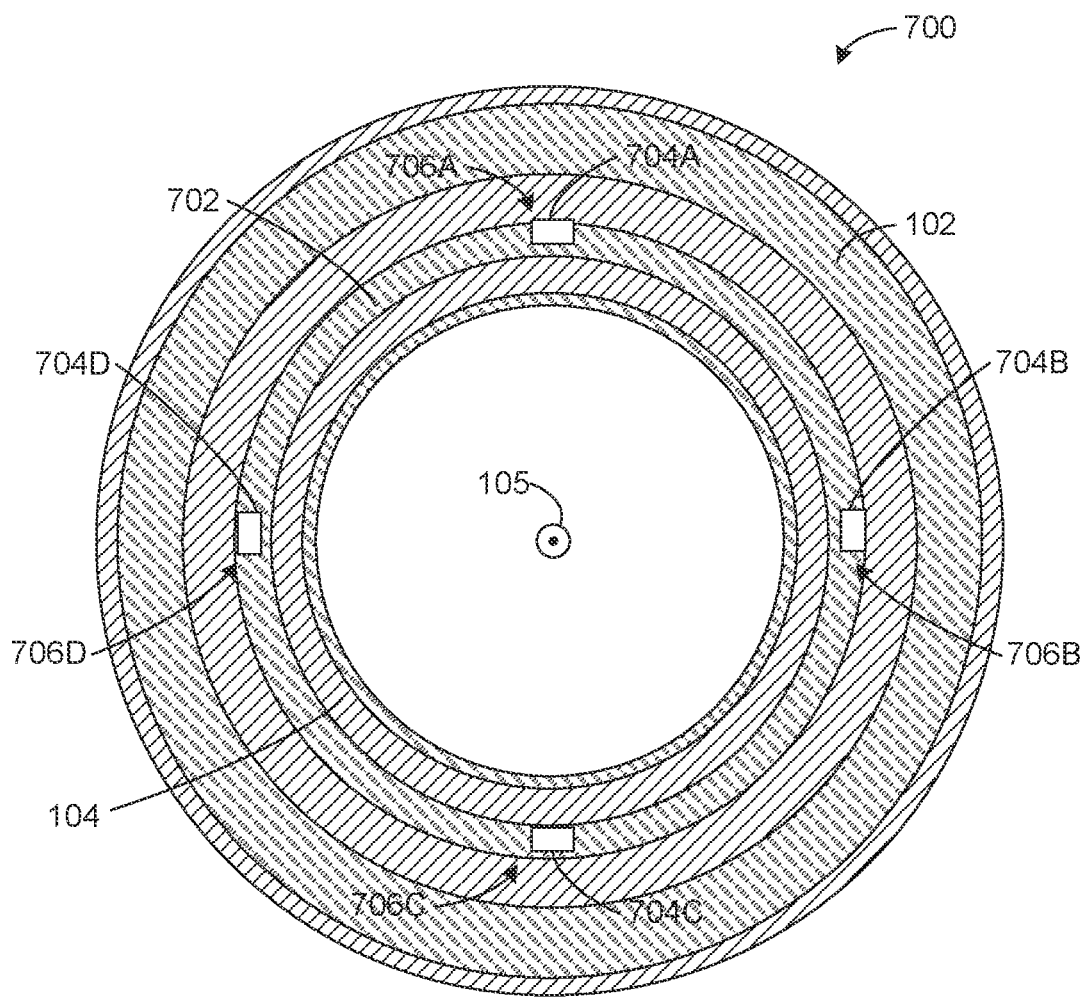
FIG. 7A is a cross-sectional view of a bearing having a second alternative liner with abradable pins with visually distinct layers.

FIG. 7A is a cross-sectional view of a bearing 700 having a second alternative liner 702 with visually distinct layers. As shown in FIG. 7A, the liner 702 includes a first abradable pin 704A, a second abradable pin 704B, a third abradable pin 704C and a fourth abradable pin 704D distributed evenly and circumferentially about the longitudinal axis 105. The example pins 704A, 704B, 704C, and 704D are disposed in a first void 706A, a second void 706B, a third void 706C and a fourth void 706D, respectively. The voids 706A, 706B, 706C, 706D are through holes in the liner 702. In other embodiments, some or all of the voids 706A, 706B, 706C, 706D are not through holes. The pins 704A, 704B, 704C, and 704D are composed of an abradable material (e.g., PTFE, an aluminum silicon alloy, etc.) that abrades during the service life of the liner 702. In some embodiments, the pins 704A, 704B, 704C, and 704D are composed of the same material as the liner 702. While the liner 702 of FIG. 6A is depicted as having the four pins 704A, 704B, 704C, 704D, other examples can have any suitable number of pins (e.g., one pin, five pins, etc.) in any suitable configuration (e.g., distributed uniformly about the longitudinal axis 105, distributed non-uniformly about the longitudinal axis 105, etc.).

Figure 7B:
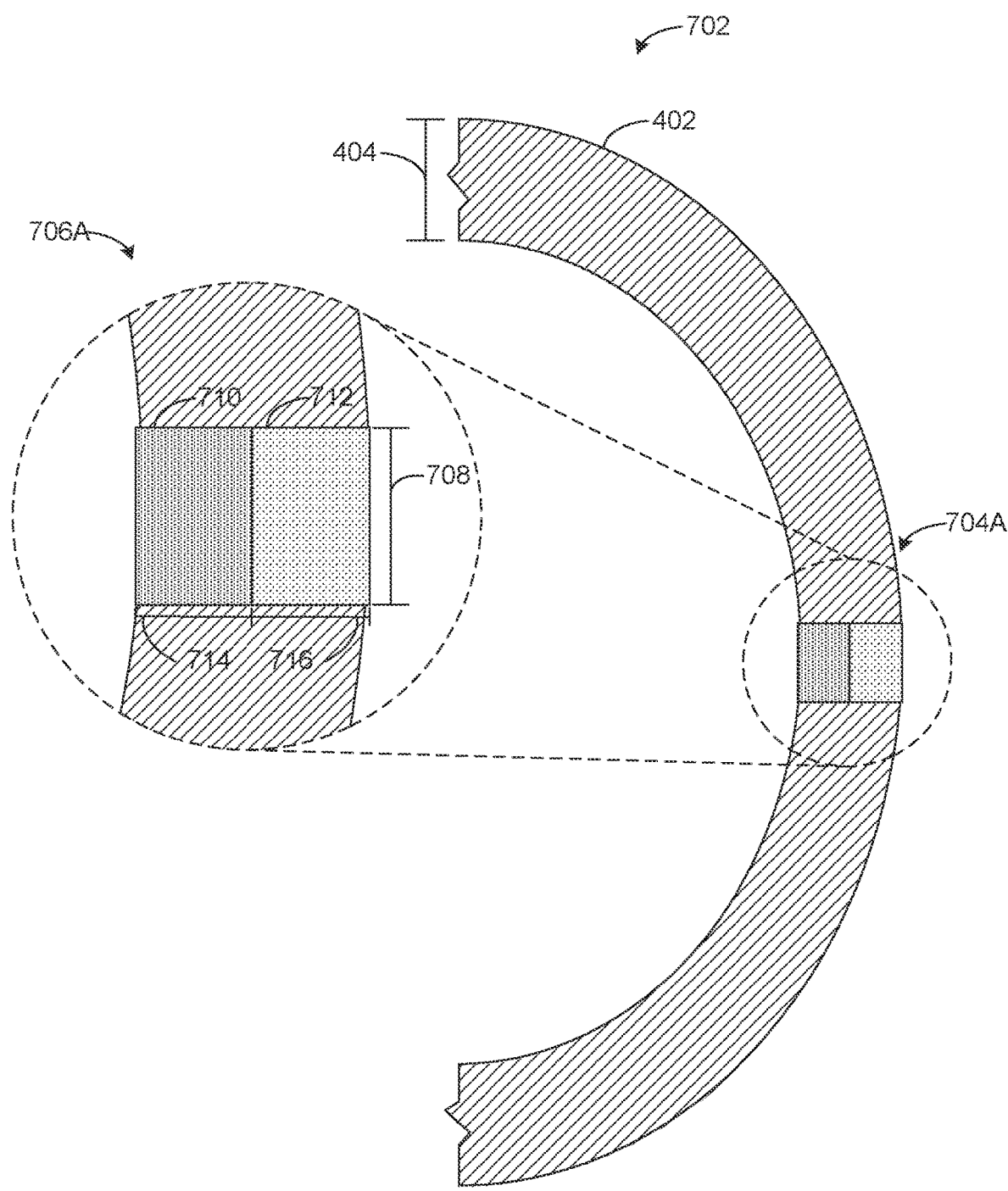
FIG. 7B is a cross-sectional view of the second alternative liner of FIG. 6A illustrating the visually distinct layers.

FIG. 7B is a partial cross-sectional view of the second alternative liner 702 of FIG. 7A. As shown in FIG. 7B, the liner 702 has the same thickness 404 and is composed of the same material as the prior art liner 400. As such, the liner 702 can be used in the same applications as the liner 400. The first void 706A and the first abradable pin 704A have a circumferential width 708. In some embodiments, the pins 704B, 704C, 704D can have the same width 706 as the first pin 704A. Alternatively, the pins 704B, 704C, 704D can have any suitable size or combination of sizes. As shown in FIG. 7B, the first pin 704A is composed of a first layer 710 having a first thickness 714 and a second layer 712 having a second thickness 716. As shown in FIG. 7B, the first layer 710 of the pin 704A is disposed on top of the second layer 712 of the pin 704A relative to the ball 104 such that the ball 104 is contact with the first layer 710 of the pin 704B at the beginning of service life of the bearing 100. As shown in FIG. 7B, the first layer 710 is visually distinct from the second layer 712. The first layer 710 and the second layer 712 can be visually distinct in any suitable manner (e.g., different colors, different patterns, different textures, different photoluminescence properties, etc.). In some examples, the first layer 710 and the second layer 712 can be composed of the same material (e.g., PTFE, etc.) dyed or otherwise colored a different color. Alternatively, the first layer 710 and the second layer 712 can be composed of different materials that are visually distinctive (e.g., PTFE and plastic, etc.). The pins 704B, 704C, 704D can be similarly configured and disposed within the liner 700 as the first pin 704A As shown in FIG. 7B, the first layer 710 and the second layer 712 have the same combined thickness 404 as the single layer 402. The thickness 714 of the first layer 710 corresponds to a level of wear associated with a wear threshold of the liner 106. In some examples, the wear threshold corresponds with the replacement threshold (e.g., 50% of the service life of the bearing 700 being exceeded, etc.) of the bearing 700. As such, if second layer 712 of the first pin 704A is exposed during inspection, the technician has an apparent visual indicator the bearing 700 should be replaced. As shown in FIG. 7B, the first thickness 714 is half of the combined thickness 404. Alternatively, the first thickness 714 can be any suitable portion of the combined thickness 404 (e.g., 40%, 60%, etc.).

In other embodiments, the pins 704A, 704B, 704C, 704D can be composed of more than two layers. In such examples, the additional layer(s) can be composed of a same of different material as the first layer 710 and the second layer 712. The additional layer(s) can be visually distinctive from the first layer 710, the second layer 712 and/or the other additional layer(s). The additional layers can be also be associated with other wear thresholds. For example, in a three-layered embodiment, the top-most layer relative to the ball 104 can be associated a level of wear associated with a wear threshold corresponding to 30% of the service life of the bearing and the middle layer can be associated with a level of wear associated with a wear threshold layer corresponding to 50% of the service life of the bearing. Alternatively, the layers can correspond to any suitable wear threshold(s).

Figure 8:
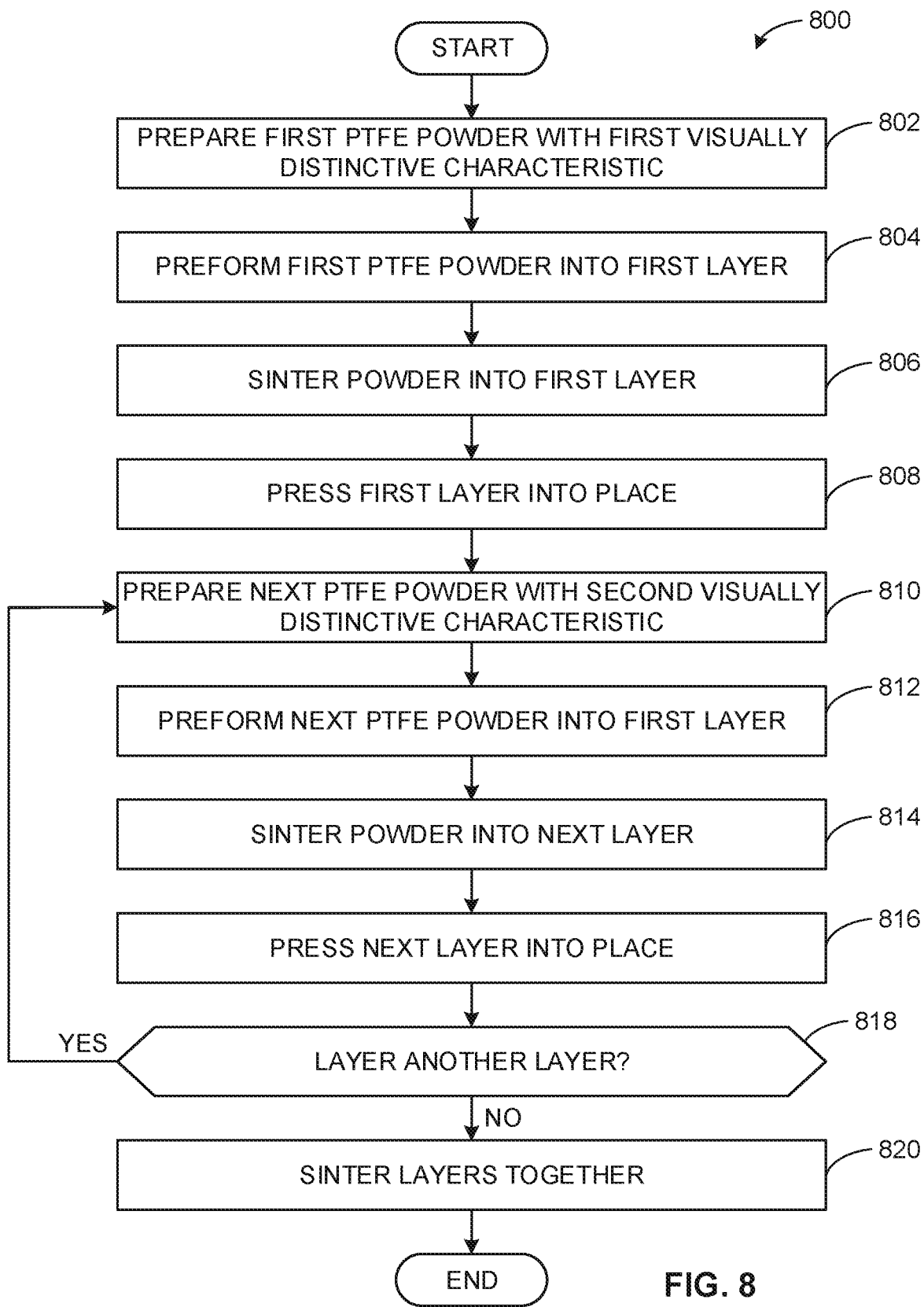
FIG. 8 is a flowchart representative of an example method of manufacturing the liner of FIG. 5.

FIG. 8 is a flowchart representative of an example method 800 of manufacturing the liner 106 of FIG. 5. The example method 800 begins at block 802 by preparing a first fluoropolymer powder (e.g., a PTFE powder, etc.) with a first visually distinctive characteristic. The first powder can be prepared by mixing a powder with a visually distinctive characteristic (e.g., a first color, etc.). Additionally or alternatively, the first powder can be prepared by dyeing the first powder with a dye with a visually distinctive characteristic. At block 804, the first powder is preformed into a second layer 504. The first powder can be preformed by depositing the powder into a mold (e.g., compression molding, etc.). Alternatively, the powder can be preformed into the layer 504 by any other suitable means (e.g., ram molding, isostatic molding, etc.). At block 806, the first powder is sintered into the first layer 504. At block 808, the second layer 504 is pressed into the bearing 100. The second layer 504 can be pressed onto an inner surface of the race 102 via a press. In other examples, the second layer 504 can be coupled to the bearing 100 by another process and/or means (e.g., a chemical adhesive, etc.).

At block 810, a next powder with a second visually distinctive characteristic. The next powder can be prepared by mixing a fluoropolymer powder with a second visually distinctive characteristic (e.g., a second color distinctive from the first color, etc.). Additionally or alternatively, the second powder can be prepared by dyeing the first powder with a dye with a second visually distinctive characteristic. At block 812, the next PTFE powder is preformed into a next layer (e.g., the first layer 502 of FIG. 5, etc.). The next PTFE powder can be preformed by depositing the powder into a mold (e.g., compression molding, etc.). Alternatively, the PTFE powder can be preformed into the next layer using another method (e.g., ram molding, isostatic molding, etc.). At block 814, the next powder is sintered into the next layer. At block 816, the next layer 504 is pressed into the bearing 100. The next layer can be pressed into the previously coupled layer (e.g., the first layer 502 can be pressed into the second layer 504, etc.). In other examples, the next layer 504 can be coupled to the bearing 100 by another process and/or means (e.g., a chemical adhesive, etc.).

If another layer is to be added to the liner 106, the method 800 returns to block 810. If another layer is not be added to the liner 106, the process 800 advances to block 820. At block 820, the deposited layers (e.g., the layers 502, 504, etc.) are sintered together to unify the layers. Alternatively, the layers 502, 504 can be unified by another other suitable means.

In some examples, the preparing of the powders (e.g., blocks 802, 810) can be omitted. In such examples, some or all of the formed layers can be soaked in dye(s) to become visually distinctive. Additionally or alternatively, the formed layers can be colored by any other suitable means.

While examples disclosed herein are described with reference to spherical bearings (e.g., the bearing 100 of FIG. 1), any other type of bearing that includes a liner can implemented in accordance with the teachings of this disclosure. That is, plain bearings and/or any other bearing that includes one or more rolling element(s) (e.g., a ball, a roller, a gear, etc.) in contact with a liner can include a liner implemented in accordance with the teachings of this disclosure. Additionally, the teachings of this disclosure are not limited to rotary bearings and can be similarly applied to linear-motion bearings. Particularly, any bearing in which movable portion(s) of the bearing abrade a liner (e.g., ball bearings, cylindrical-roller bearings, spherical-roller bearings, gear bearing, tapered-roller bearings, thrust bearings, etc.) can have similarly difficult to detect wear.

Further aspects of the invention are provided by the subject matter of the following clauses:

1. A bearing comprising a movable portion, a race to receive the movable portion along a first surface to thereby permit movement of the movable portion within the race, and a liner disposed on the first surface of the race, the liner having a first layer and a second layer, the first layer disposed on top of the second layer, the first layer visually distinctive from the second layer.

2. The bearing of any preceding clause, wherein the first layer and/or the second layer comprise polytetrafluoroethylene.

3. The bearing of any preceding clause, wherein the first layer comprises a first polytetrafluoroethylene dyed a first color and the second layer comprises a second polytetrafluoroethylene dyed a second color.

4. The bearing of any preceding clause, wherein a thickness of the first layer corresponds with a level of wear indicating the bearing has exceeded a first wear threshold.

5. The bearing of any preceding clause, wherein the first wear threshold corresponds to the bearing having exceeded half of a service life.

6. The bearing of any preceding clause, wherein the liner further includes a third layer visually distinctive from the first layer and the second layer, the third layer disposed between the first layer and the second layer.

7. The bearing of any preceding clause, wherein a thickness of the first layer corresponds with a first level of wearing indicating the bearing has exceeded a first wear threshold and a thickness of the third layer corresponds with a second level of wearing indicating the bearing has exceeded a second wear threshold.

8. An apparatus comprising a connecting rod, and a bearing, including a movable portion, a race to receive the movable portion along a first surface to thereby permit movement of the movable portion within the race, and a liner disposed on the first surface, the liner having a first layer and a second layer, the first layer disposed on top of the second layer, the first layer visually distinctive from the second layer.

9. The apparatus of any preceding clause, wherein the first layer and the second layer include polytetrafluoroethylene.

10. The apparatus of any preceding clause, wherein the first layer includes a first polytetrafluoroethylene dyed a first color and the second layer includes a second polytetrafluoroethylene dyed a second color.

11. The apparatus of any preceding clause, wherein a thickness of the first layer corresponds with a level of wear indicating the bearing has exceeded a first wear threshold.

12. The apparatus of any preceding clause, wherein the first wear threshold corresponds to the bearing having exceeded half of a service life.

13. The apparatus of any preceding clause, wherein the liner further includes a third layer visually distinctive from the first layer and the second layer, the third layer disposed between the first layer and the second layer.

14. The apparatus of any preceding clause, wherein a thickness of the first layer corresponds with a first level of wearing indicating the bearing has exceeded a first wear threshold and a thickness of the third layer corresponds with a second level of wearing indicating the bearing has exceeded a second wear threshold.

15. The apparatus of any preceding clause, wherein the connecting rod couples a gas turbine engine to an aircraft.

16. A bearing comprising a movable portion a race to receive the movable portion along a first surface to thereby permit movement of the movable portion within the race, and a liner disposed on the first surface of the race, the liner having a first void extending at least partially therethrough.

17. The bearing of any preceding clause, wherein the liner further includes a plurality of voids, the plurality of voids including the first void, the plurality of voids evenly distributed radially about the race.

18. The bearing of any preceding clause, further including an abradable pin disposed in the first void.

19. The bearing of any preceding clause, wherein the abradable pin includes a first layer and a second layer, the first layer disposed on top of the second layer, the first layer visually distinctive from the second layer.

20. The bearing of any preceding clause, wherein a thickness of the first layer corresponds with a level of wear indicating the bearing has exceeded a wear threshold.

The following claims are hereby incorporated into this Detailed Description by this reference, with each claim standing on its own as a separate embodiment of the present disclosure.

What is claimed is:

1. An apparatus comprising:
a connecting rod; and
a bearing, including:
a movable portion;
a race to receive the movable portion along a first surface to thereby permit movement of the movable portion within the race;
a liner disposed on the first surface, the liner having a first void extending at least partially therethrough; and
an abradable pin disposed in the first void, the abradable pin including a first layer and a second layer, the first layer disposed on top of the second layer, the first layer visually distinctive from the second layer.

2. The apparatus of claim 1, wherein at least one of the first layer or the second layer comprise polytetrafluoroethylene.

3. The apparatus of claim 2, wherein the first layer comprises a first polytetrafluoroethylene dyed a first color and the second layer comprises a second polytetrafluoroethylene dyed a second color.

4. The apparatus of claim 1, wherein a thickness of the first layer corresponds with a level of wear indicating the bearing has exceeded a first wear threshold.

5. The apparatus of claim 4, wherein the first wear threshold corresponds to the bearing having exceeded half of a service life.

6. The apparatus of claim 1, wherein the abradable pin further includes a third layer visually distinctive from the first layer and the second layer, the third layer disposed between the first layer and the second layer.

7. The apparatus of claim 6, wherein a thickness of the first layer corresponds with a first level of wearing indicating the bearing has exceeded a first wear threshold and a thickness of the third layer corresponds with a second level of wearing indicating the bearing has exceeded a second wear threshold.

8. The apparatus of claim 1, wherein the connecting rod couples a gas turbine engine to an aircraft.

9. The apparatus of claim 1, wherein the first layer has a first photoluminescence property and the second layer has a second photoluminescence property different than the first photoluminescence property.

10. The apparatus of claim 1, wherein the first layer has a first visual pattern and the second layer has a second visual pattern different than the first visual pattern.

11. A bearing comprising:
a movable portion
a race to receive the movable portion along a first surface to thereby permit movement of the movable portion within the race;
a liner disposed on the first surface of the race, the liner having a first void extending at least partially therethrough; and
an abradable pin disposed in the first void, the abradable pin includes a first layer and a second layer, the first layer disposed on top of the second layer, the first layer visually distinctive from the second layer.

12. The bearing of claim 11, wherein the liner further includes a plurality of voids, the plurality of voids including the first void, the plurality of voids evenly distributed radially about the race.

13. The bearing of claim 11, wherein a thickness of the first layer corresponds with a level of wear indicating the bearing has exceeded a wear threshold.

14. The bearing of claim 13, wherein the wear threshold corresponds to the bearing having exceeded half of a service life.

15. The bearing of claim 11, wherein at least one of the first layer or the second layer comprise polytetrafluoroethylene.

16. The bearing of claim 15, wherein the first layer comprises a first polytetrafluoroethylene dyed a first color and the second layer comprises a second polytetrafluoroethylene dyed a second color.

17. The bearing of claim 11, wherein the first layer has a first photoluminescence property and the second layer has a second photoluminescence property different than the first photoluminescence property.

18. The bearing of claim 11, wherein the first layer has a first visual pattern and the second layer has a second visual pattern different than the first visual pattern.

* * * * *